(12) United States Patent
Chung

(10) Patent No.: US 12,393,033 B2
(45) Date of Patent: Aug. 19, 2025

(54) OPTICAL LENS MODULE, OPTICAL ENGINE MODULE AND HEAD-MOUNTED DISPLAY

(71) Applicant: Coretronic Corporation, Hsin-Chu (TW)

(72) Inventor: Meng-Feng Chung, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 18/507,124

(22) Filed: Nov. 13, 2023

(65) Prior Publication Data

US 2024/0168297 A1 May 23, 2024

(30) Foreign Application Priority Data

Nov. 17, 2022 (CN) .......................... 202211458264.2

(51) Int. Cl.
| | |
|---|---|
| G02B 27/01 | (2006.01) |
| G02B 5/30 | (2006.01) |
| G02B 13/00 | (2006.01) |
| G02B 27/28 | (2006.01) |

(52) U.S. Cl.
CPC ....... *G02B 27/0172* (2013.01); *G02B 5/3083* (2013.01); *G02B 13/0045* (2013.01); *G02B 27/283* (2013.01)

(58) Field of Classification Search
CPC .............. G02B 27/0172; G02B 5/3083; G02B 13/0045; G02B 27/283
See application file for complete search history.

(56) References Cited

U.S. PATENT DOCUMENTS

| | | | |
|---|---|---|---|
| 10,394,040 B2 | 8/2019 | Gollier et al. | |
| 10,591,707 B2 | 3/2020 | Khan et al. | |
| 2020/0348528 A1 | 11/2020 | Jamali et al. | |
| 2021/0315662 A1* | 10/2021 | Freeman | G06F 3/012 |
| 2022/0252848 A1* | 8/2022 | Kurtz | H04N 23/81 |

FOREIGN PATENT DOCUMENTS

| | | |
|---|---|---|
| CN | 103064175 | 4/2013 |
| CN | 108803023 | 11/2018 |
| CN | 213690113 | 7/2021 |
| CN | 114545589 | 5/2022 |
| CN | 112596238 | 9/2022 |
| TW | 202101064 | 1/2021 |
| TW | I715145 | 1/2021 |

* cited by examiner

*Primary Examiner* — Robert J Michaud
(74) *Attorney, Agent, or Firm* — JCIPRNET

(57) ABSTRACT

An optical lens module configured to receive at least one image light beam from an image source side is provided. The optical lens module includes a plurality of lens elements. The plurality of lens elements includes a first lens element to a fifth lens element arranged in sequence along an optical axis from an object side to the image source side, and the optical lens module have a semi-reflective layer, a phase retardation layer and a polarization reflection layer respectively formed on the surfaces of a part of the plurality of lens elements. The optical lens module has an aperture on the object side. Wherein, the optical lens module is a secondary imaging optical system, and the at least one image light beam is transmitted through the optical lens module to form an intermediate image between the aperture and the image source side.

25 Claims, 6 Drawing Sheets

OPTICAL LENS MODULE, OPTICAL ENGINE MODULE AND HEAD-MOUNTED DISPLAY

CROSS-REFERENCE TO RELATED APPLICATION

This application claims the priority benefit of China application serial no. 202211458264.2, filed on Nov. 17, 2022. The entirety of the above-mentioned patent application is hereby incorporated by reference herein and made a part of this specification.

BACKGROUND

Technical Field

The disclosure relates to an optical module and a display, and in particular relates to an optical lens module, an optical module, and a head-mounted display.

Description of Related Art

A head-mounted display (HMD) is currently a product with great development potential. A head-mounted display with augmented reality (AR) technology and virtual reality (VR) technology uses an optical engine module to project an image light beam to a waveguide to provide users with a virtual reality image experience.

However, the field of view angle of the existing optical lens modules of head-mounted displays does not exceed 35 degrees. To increase the field of view angle, the volume of the optical lens module is inevitably increased. In addition, in order to improve the optical efficiency to increase the brightness, the optical design requires an increase to the aperture of the optical lens module, which also increases the volume of the optical lens module. Therefore, how to develop an optical lens module with a large field of view angle, a small volume, and a large aperture is one of the goals in this field.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides an optical lens module, an optical engine module, and a head-mounted display, which have a small volume, a large aperture, a large field of view angle, and good optical effect.

The other objectives and advantages of the present invention may be further understood from the descriptive features disclosed in the present invention.

In order to achieve one of, or portions of, or all of the above objectives or other objectives, the present invention provides an optical lens module configured to receive at least one image light beam from an image source side. The optical lens module includes multiple lens elements. The multiple lens elements include a first lens element, a second lens element, a third lens element, a fourth lens element, and a fifth lens element arranged in sequence along an optical axis from an object side to the image source side, and the optical lens module have a semi-reflective layer, a phase retardation layer and a polarization reflection layer respectively formed on surfaces of a part of the lens elements. The optical lens module has an aperture on the object side. The optical lens module is a secondary imaging optical system, and the at least one image light beam is transmitted by the optical lens module and forms an intermediate image between the aperture and the image source side.

In order to achieve one of, or portions of, or all of the above objectives or other objectives, the present invention provides an optical engine module, including at least one display element and an optical lens module. The at least one display element is configured to provide at least one image light beam. The optical lens module is disposed on a transmission path of the at least one image light beam. The optical lens module includes multiple lens elements, and the lens elements include a first lens element, a second lens element, a third lens element, a fourth lens element, and a fifth lens element arranged in sequence along an optical axis from an object side to the at least one display element, and the optical lens module have a semi-reflective layer, a phase retardation layer and a polarization reflection layer respectively formed on surfaces of a part of the lens elements. The optical lens module has an aperture on the object side. The optical lens module is a secondary imaging optical system, and the at least one image light beam is transmitted by the optical lens module and forms an intermediate image between the aperture and the at least one display element.

In order to achieve one of, or portions of, or all of the above objectives or other objectives, the present invention provides a head-mounted display, including a waveguide, a coupling-in element, a coupling-out element, and an optical engine module. The waveguide has a first side and a second side opposite to each other. The coupling-in element is disposed on the first side or the second side. The coupling-out element is disposed on the first side. The optical engine module is disposed on the first side and corresponds to the coupling-in element. The optical engine module includes at least one display element and an optical lens module. The at least one display element is configured to provide at least one image light beam. The optical lens module is disposed on a transmission path of the at least one image light beam. The optical lens module includes multiple lens elements. The optical lens module has a semi-reflective layer, a phase retardation layer and a polarization reflection layer respectively formed on surfaces of a part of the lens elements. The at least one image light beam is transmitted to the coupling-in element and the coupling-out element in sequence by the optical engine module. The optical engine module is a secondary imaging optical system, and the at least one image light beam is transmitted by the optical lens module and forms an intermediate image between the aperture and the at least one display element.

Based on the above, the embodiments of the present invention have at least one of the following advantages or effects. In the optical lens module, the optical engine module, and the head-mounted display of the present invention, the multiple lens elements include a first lens element, a second lens element, a third lens element, a fourth lens element, and a fifth lens element arranged in sequence along an optical axis from an object side to the image source side, and the optical lens module have a semi-reflective layer, a phase retardation layer and a polarization reflection layer respectively formed on surfaces of a part of the lens elements. Therefore, the image light beam provided by the display element may achieve the effect of folding the light path through the semi-reflective layer, the phase retardation layer, and the polarization reflection layer. In this way, the volume of the optical lens module may be reduced, and at the same time, the optical lens module has a large field of view angle and a large aperture.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
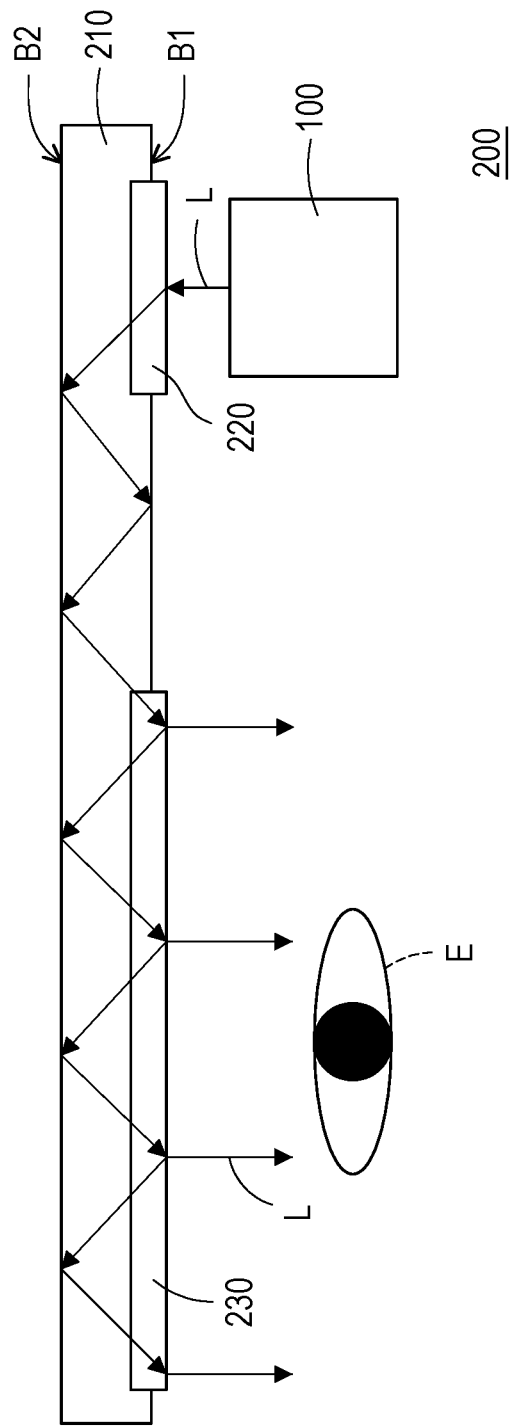
FIG. 1 is a schematic diagram of a head-mounted display according to an embodiment of the present invention.

FIG. 1 is a schematic diagram of a head-mounted display according to an embodiment of the present invention. Referring to FIG. 1, this embodiment provides a head-mounted display 200, which is configured to provide an image light beam L to the human eye E. After the image light beam L leaves the head-mounted display 200, a virtual image is formed at a certain distance, and the virtual image is imaged on the human eye E. The head-mounted display 200 may be applied in the display technology of augmented reality (AR) or virtual reality (VR). The head-mounted display 200 includes a waveguide 210, a coupling-in element 220, a coupling-out element 230, and an optical engine module 100.

The waveguide 210 has a first side B1 and a second side B2 that are opposite to each other, in which the first side B1 is defined as the side close to the human eye E, and the second side B2 is defined as the side further away from the human eye E. The waveguide 210 is, for example, a plate-shaped substrate made of a light-transmitting material (e.g., glass). The coupling-in element 220 is disposed on the first side B1 or the second side B2 of the waveguide 210, and the coupling-out element 230 is disposed on the first side B1 of the waveguide 210. For example, in this embodiment, the coupling-in element 220 is disposed on the first side B1 of the waveguide 210, that is, the coupling-in element 220 and the coupling-out element 230 are located on the same side of the waveguide 210. In this embodiment, the coupling-in element 220 is, for example, a reflecting mirror, a prism, an embossed grating, or a holographic grating, and the coupling-out element 230 is, for example, an arrayed transflective (semi-transmissive semi-reflective) mirror, an embossed grating, or a holographic grating.

The optical engine module 100 is disposed on the first side B1 of the waveguide 210 and corresponds to the coupling-in element 220. The optical engine module 100 provides the image light beam L to the coupling-in element 220, the image light beam L passes through the coupling-in element 220 and is guided to the inside of the waveguide 210 and transmitted in the form of total reflection, and the image light beam L transmitted inside the waveguide 210 is transmitted to the coupling-out element 230 and then transmitted to the human eye E. The image light beam L is transmitted to the coupling-in element 220 and the coupling-out element 230 in sequence from the optical engine module 100. In this embodiment, the field of view angle of the optical engine module 100 is greater than 65 degrees, and the optical engine module 100 is a secondary imaging optical system.

Figure 2:
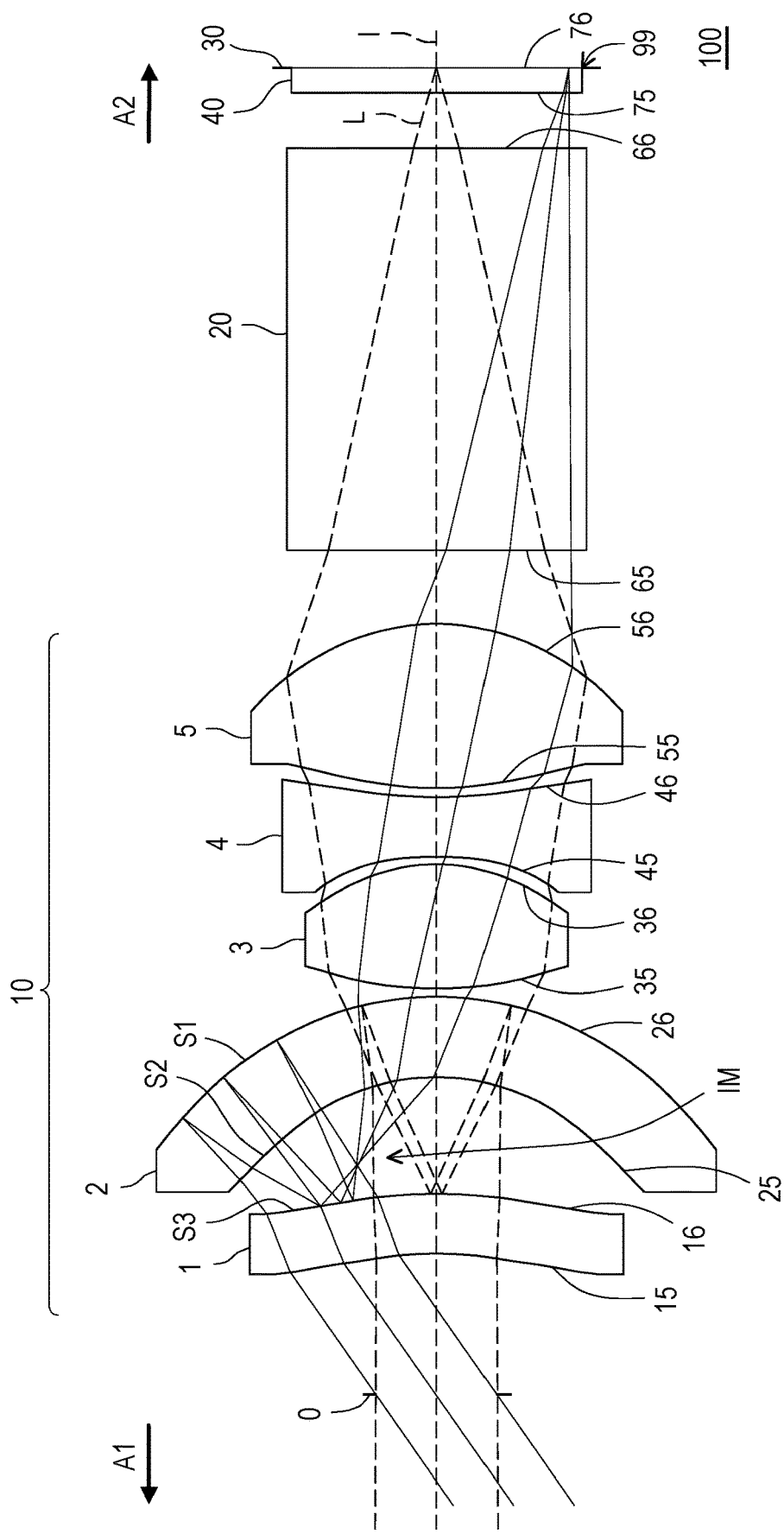
FIG. 2 is a schematic diagram of an optical engine module according to an embodiment of the present invention.

FIG. 2 is a schematic diagram of an optical engine module according to an embodiment of the present invention. Referring to FIG. 2, in this embodiment, the optical engine module 100 includes at least one display element 30 and an optical lens module 10. The at least one display element 30 includes a light exiting surface 99. The at least one display element 30 is configured to provide at least one image light beam L including the display content. For example, in this embodiment, the optical engine module 100 may include three display elements 30 (for convenience of illustration, only one is shown in FIG. 2) respectively configured to provide red, blue, and green image light beams L. The technical effect of this embodiment is that the optical engine module 100 may provide the image light beams L with higher brightness. In different embodiments, the optical engine module 100 may only include one display element 30 configured to provide the image light beam L including at least one of red light, blue light and green light. The technical effect of this embodiment is that the optical elements in the optical engine module 100 may be simplified, for example, no beam splitter is required. In this embodiment, the display element 30 may be a self-illuminating display panel, such as a light-emitting diode display (LED display) or a micro light-emitting diode display (micro LED display). In addition, display devices requiring external lighting sources may also be used, such as a transmissive liquid-crystal display (LCD), a reflective liquid crystal on silicon panel (LCoS panel), a digital micro-mirror device (DMD), or laser beam scanning (LBS), but the present invention is not limited thereto.

The optical lens module 10 is disposed on the transmission path of the image light beam L and configured to receive at least one image light beam L from the image source side A2. The at least one image light beam L transmitted to multiple lens elements is, for example, circularly polarized light. In an embodiment, the optical engine module 100 may include a polarizer (not shown) configured to form the circularly polarized light. The optical lens module 10 includes multiple lens elements, and the optical lens module 10 has a semi-reflective layer S1, a phase retardation layer S2, and a polarization reflection layer S3, which are respectively formed on the surfaces of a part of the lens elements.

In this embodiment, the optical engine module 100 further includes a light combining element 20 disposed between the optical lens module 10 and the display element 30, the display element 30 is located at the image source side A2 of the optical lens module 10. In an embodiment where there are multiple display elements 30, the light combining element 20 may be, for example, an X cube, an X plate, or a beam splitter. In an embodiment where the number of the display element 30 is one, the light combining element 20 may be, for example, a light transmissive prism. In this embodiment, the optical engine module 100 further includes a protective cover 40 disposed between the light exiting surface 99 of the display element 30 and the light combining element 20, and configured to cover the light exiting surface 99 of the display element 30 to prevent dust from entering.

The aforementioned lens elements include a first lens element 1, a second lens element 2, a third lens element 3, a fourth lens element 4, and a fifth lens element 5 arranged in sequence along the optical axis I from the object side A1 to the image source side A2, and the optical lens module 10 has an aperture of 0 at the object side A1. The optical lens module 10 is a secondary imaging optical system. The image light beam L is transmitted by the optical lens module 10 and forms an intermediate image IM between the aperture 0 and the image source side A2. In this embodiment, the intermediate image IM is located within the range of the first lens element 1 and the second lens element 2. Referring to FIG. 1 and FIG. 2, when the image light beam L emitted by the display element 30 enters the optical lens module 10, and passes through the fifth lens element 5, the fourth lens element 4, the third lens element 3, the second lens element 2, the first lens element 1, and the aperture 0, the image light beam L is transmitted into the waveguide 210 through the coupling-in element 220 to finally form a virtual image. The position of aperture 0 is located on the coupling-in element 220.

In this embodiment, the first lens element 1, the second lens element 2, the third lens element 3, the fourth lens element 4, the fifth lens element 5 of the optical lens module 10, and the light combining element 20 and the protective cover 40 of the optical engine module 100 each have an object side surface 15, 25, 35, 45, 55, 65, and 75 facing the object side A1 and an image side surface 16, 26, 36, 46, 56, 66, and 76 facing the image source side A2. In this embodiment, at least one of the lens elements of the optical lens module 10 is an aspheric lens. The first lens element 1 to the fifth lens element 5 may be a combination of plastic lens elements and glass lens elements.

The first lens element 1 has a negative refractive power. Viewed along the direction toward the image source side A2, the object side surface 15 of the first lens element 1 is, for example, concave, and the image side surface 16 of the first lens element 1 is, for example, convex. In this embodiment, the object side surface 15 and the image side surface 16 of the first lens element 1 are, for example, aspheric surfaces. The polarization reflection layer S3 is disposed on the image side surface 16 of the first lens element 1, and the polarization reflection layer S3 is configured to reflect the first linearly polarized light (e.g., P polarized light or S polarized light) and allow the second linearly polarized light (e.g., S polarized light or P polarized light) to pass through. When the first linearly polarized light is P polarized light, the second linearly polarized light is S polarized light. When the first linearly polarized light is S polarized light, the second linearly polarized light is P polarized light. The polarization reflection layer S3 is, for example, a polarization reflector.

The second lens element 2 has a negative refractive power. Viewed along the direction toward the image source side A2, the object side surface 25 of the second lens element 2 is, for example, concave, and the image side surface 26 of the second lens element 2 is, for example, convex. In this embodiment, the object side surface 25 and the image side surface 26 of the second lens element 2 are, for example, aspheric surfaces. The semi-reflective layer S1 is disposed on the image side surface 26 of the second lens element 2, and the phase retardation layer S2 is disposed on the object side surface 25 of the second lens element 2. In this embodiment, the semi-reflective layer S1 is, for example, configured to allow the first circularly polarized light (e.g., right-handed polarized light or left-handed polarized light) to pass through, and configured to reflect the second circularly polarized light (e.g., left-handed polarized light or right-handed polarized light). When the first circularly polarized light is left-handed polarized light, the second circularly polarized light is right-handed polarized light. When the first circularly polarized light is right-handed polarized light, the second circularly polarized light is left-handed polarized light. The semi-reflective layer S1 is, for example, a semi-transmissive semi-reflective mirror. The phase retardation layer S2 is, for example, a quarter-wavelength phase retarder configured to convert the polarization state of the image light beam L, for example, converting the first (second) linearly polarized light o the second (first) linearly polarized light.

The third lens element 3 has a positive refractive power. Viewed along the direction toward the image source side A2, the object side surface 35 of the third lens element 3 is, for example, convex, and the image side surface 36 of the third lens element 3 is, for example, convex. In this embodiment, the object side surface 35 and the image side surface 36 of the third lens element 3 are, for example, aspheric surfaces.

The fourth lens element 4 has a negative refractive power. Viewed along the direction toward the image source side A2, the object side surface 45 of the fourth lens element 4 is, for example, concave, and the image side surface 46 of the fourth lens element 4 is, for example, concave. In this embodiment, the object side surface 45 and the image side surface 46 of the fourth lens element 4 are, for example, aspheric surfaces.

The fifth lens element 5 has a positive refractive power. Viewed along the direction toward the image source side A2, the object side surface 55 of the fifth lens element 5 is, for example, convex, and the image side surface 56 of the fifth lens element 5 is, for example, convex. In this embodiment, the object side surface 55 and the image side surface 56 of the fifth lens element 5 are, for example, aspheric surfaces.

In this embodiment, the multiple lens elements of the optical lens module 10 are embodied as five lens elements.

The total length of the optical engine module 100 is, for example, 16.5 millimeters (mm), and the volume of the optical engine module 100 may be less than 1 cubic centimeter ($cm^3$). The field of view angle of the optical lens module 10 is greater than 65 degrees, and the optimum field of view angle is 70 degrees. The aperture value (F/#) of the optical lens module 10 is −1.6, and the equivalent focal length is a negative value. The optical lens module 10 is an optical structure of secondary imaging, an intermediate image IM may be formed between the aperture 0 and the display element 30. Therefore, the negative value of the aperture value and the equivalent focal length in this embodiment is due to the defined direction. Other optical data are shown in Table 1 below.

TABLE 1

| Element | Surface | Radius of curvature (mm) | Thickness (mm) | Refractive index | Abbe number |
|---|---|---|---|---|---|
| Aperture | | Infinite | 1.75 | | |
| First lens element 1 | Object side surface 15 | −5.37 | 0.75 | 1.84666 | 23.78 |
| First lens element 1 | Image side surface 16 | −5.73 | 1.46 | | |
| Second lens element 2 | Object side surface 25 | −2.69 | 1.00 | 1.68176 | 30.37 |
| Second lens element 2 | Image side surface 26 | −3.94 | −1.00 | 1.68176 | 30.37 |
| Second lens element 2 | Object side surface 25 | −2.69 | −1.46 | | |
| First lens element 1 | Image side surface 16 | −5.73 | 1.46 | | |
| Second lens element 2 | Object side surface 25 | −2.69 | 1.00 | 1.68176 | 30.37 |
| Second lens element 2 | Image side surface 26 | −3.94 | 0.10 | | |
| Third lens element 3 | Object side surface 35 | 5.03 | 1.54 | 1.71317 | 53.84 |
| Third lens element 3 | Image side surface 36 | −2.19 | 0.10 | | |
| Fourth lens element 4 | Object side surface 45 | −3.38 | 0.75 | 1.84647 | 23.78 |
| Fourth lens element 4 | Image side surface 46 | 7.28 | 0.10 | | |
| Fifth lens element 5 | Object side surface 55 | 4.13 | 2.04 | 1.71308 | 53.85 |
| Fifth lens element 5 | Image side surface 56 | −2.84 | 0.92 | | |
| Light combining element 20 | Object side surface 65 | Infinite | 5.00 | 1.51680 | 64.17 |
| | Image side surface 66 | Infinite | 0.69 | | |
| Protective cover 40 | Object side surface 75 | Infinite | 0.30 | 1.50847 | 61.19 |
| | Image side surface 76 | Infinite | 0.01 | | |
| Display element 30 | Light exiting surface 99 | Infinite | 0.00 | | |

In this embodiment, the waveguide 210 of FIG. 1 is designed, for example, to increase the eye socket moving range (the range where the human eye E may still clearly see the virtual image when the human eye E is moving around the system center after the head-mounted display 200 is worn) to more than 10 millimeters (mm), and the diameter of the aperture 0 of the optical lens module 10 is, for example, 1.5 millimeters (mm). Since the diameter of the aperture 0 is small, the diameter of the image light beam L entering the waveguide 210 is small, which may effectively reduce the thickness of the waveguide 210 to achieve the effect of the head-mounted display 200 with a small volume.

The image light beam L provided by the display element 30 is the first circularly polarized light (e.g., right-handed polarized light or left-handed polarized light), which passes through the protective cover 40, the light combining element 20, the fifth lens element 5, the fourth lens element 4, and the third lens element 3 in sequence. When the image light beam L from the object side surface 35 of the third lens element 3 is transmitted to the semi-reflective layer S1 on the image side surface 26 of the second lens element 2, at least a portion of the image light beam L passes through the semi-reflective layer S1. At this time, the image light beam L is the first circularly polarized light. The first circularly polarized light is continuously transmitted and passes through the phase retardation layer S2 on the object side surface 25 of the second lens element 2, and the phase retardation layer S2 is configured to convert the first circularly polarized light into the first linearly polarized light (e.g., P polarized light or S polarized light). At this time, the image light beam L is the first linearly polarized light. When the image light beam L of the first linearly polarized light from the object side surface 25 of the second lens element 2 is transmitted to the polarization reflection layer S3 on the image side surface 16 of the first lens element 1, the polarization reflection layer S3 is configured to reflect the first linearly polarized light and transmit the first linearly polarized light toward the object side surface 25 of the second lens element 2. When the first linearly polarized light from the image side surface 16 of the first lens element 1 passes through the phase retardation layer S2 on the object side surface 25 of the second lens element 2, the phase retardation layer S2 is configured to convert the first linearly polarized light into the first circularly polarized light. At this time, the image light beam L is the first circularly polarized light. When the first circularly polarized light from the object side surface 25 of the second lens element 2 is transmitted to the semi-reflective layer S1 on the image side surface 26 of the second lens element 2, the first circularly polarized light is reflected to form the second circularly polarized light (e.g., left-handed polarized light or right-handed polarized light) and transmitted toward the object side surface 25 of the second lens element 2. At this time, the image light beam L is the second circularly polarized light.

As described above, the second circularly polarized light from the image side surface 26 of the second lens element 2 is transmitted and passes through the phase retardation layer S2 on the object side surface 25 of the second lens element 2, and the phase retardation layer S2 is configured to convert the second circularly polarized light into the second linearly polarized light (e.g., S polarized light or P polarized light). At this time, the image light beam L is the second linearly polarized light. Finally, the second linearly polarized light is transmitted from the object side surface 25 of the second lens element 2 to the polarization reflection layer S3 on the image side surface 16 of the first lens element 1. The polarization reflection layer S3 is configured to allow the second linearly polarized light to pass through. The second linearly polarized light is transmitted from the image side surface 16 of the first lens element 1 to the aperture 0 and enters the waveguide 210. In other words, the image light beam L provided by the display element 30 is transmitted to the semi-reflective layer S1, the phase retardation layer S2, the polarization reflection layer S3, the phase retardation layer S2, the semi-reflective layer S1, the phase retardation layer S2, and the polarization reflection layer S3 in sequence, which may achieve the effect of folding the light path. In this way, the volume of the optical lens module 10 may be reduced.

In this embodiment, the object side surfaces 15, 25, 35, 45, and 55 and the image side surfaces 16, 26, 36, 46, and 56 of the first lens element 1, the second lens element 2, the third lens element 3, the fourth lens element 4, and the fifth lens element 5, a total of ten surfaces, are all aspherical surfaces. The object side surfaces 15, 25, 35, 45, and 55 and the image side surfaces 16, 26, 36, 46, and 56 are typical aspheric surfaces. These aspheric surfaces are defined according to the following Formula (1):

$$z = \frac{cr^2}{1+\sqrt{1-(1+k)c^2r^2}} + Ar^4 + Br^6 + Cr^8 + Dr^{10} + Er^{12} + Fr^{14} \quad \text{Formula (1)}$$

in which:

Z is the shift (sag) in the optical axis I direction;

r is the radius of curvature close to the optical axis I;

k is a conic constant;

c is the aspheric surface height, which is the height from the center of the lens element to the edge of the lens element;

A to F are aspheric coefficients.

The aspheric coefficients of the object side surface 15 of the first lens element 1 to the image side surface 56 of the fifth lens element 5 in Formula (1) are shown in Table 2 below. The field number 15 in Table 2 indicates the aspheric coefficients of the object side surface 15 of the first lens element 1, and the other fields may be deduced by analogy. In this embodiment and the following embodiments, the second-order aspheric coefficients are all zero.

TABLE 2

| Surface | K | A | B | C |
|---|---|---|---|---|
| 15 | −0.55832 | 5.11299E−03 | 6.92354E−04 | 0 |
| 16 | 1.07630 | 7.53931E−03 | 9.46662E−05 | 1.51747E−05 |
| 25 | −0.65477 | −6.72407E−03 | 6.54771E−04 | 0 |
| 26 | −0.44757 | −1.15806E−03 | 3.49737E−05 | −2.57437E−06 |
| 35 | −3.43416 | 5.06513E−03 | −3.45648E−04 | 0 |
| 36 | −1.11359 | 4.07164E−04 | 7.17649E−05 | 0 |
| 45 | −0.79901 | −3.73703E−03 | −5.62306E−03 | 0 |
| 46 | 7.96382 | 3.60710E−03 | −3.56976E−03 | 1.67655E−04 |
| 55 | 0 | −1.05985E−02 | 1.97163E−05 | −5.80727E−05 |
| 56 | 0 | 3.15305E−04 | 3.96757E−04 | 1.23294E−05 |

Figure 3:
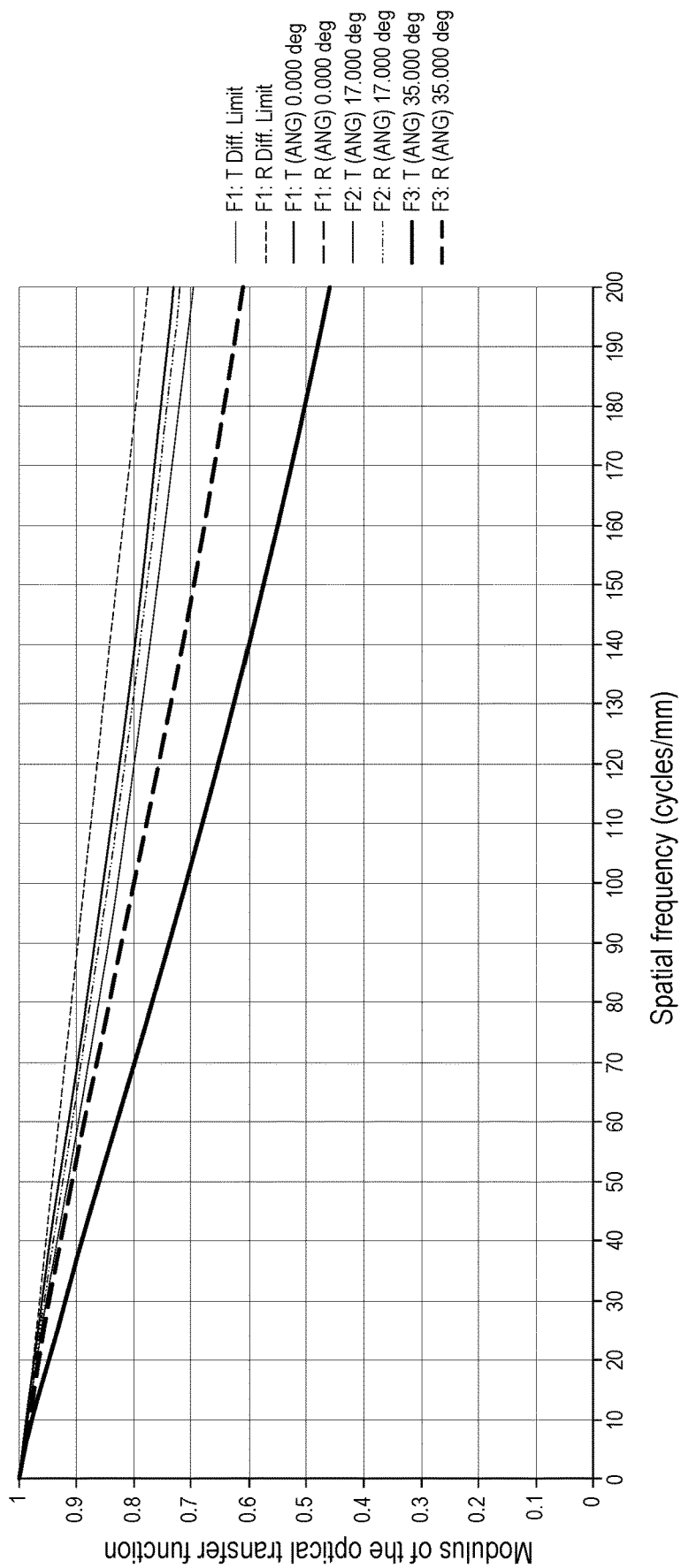
FIG. 3 and FIG. 4 respectively are modulation transfer function charts of different representations of the optical lens module in FIG. 2 on the imaging plane of the display element.
Figure 4:
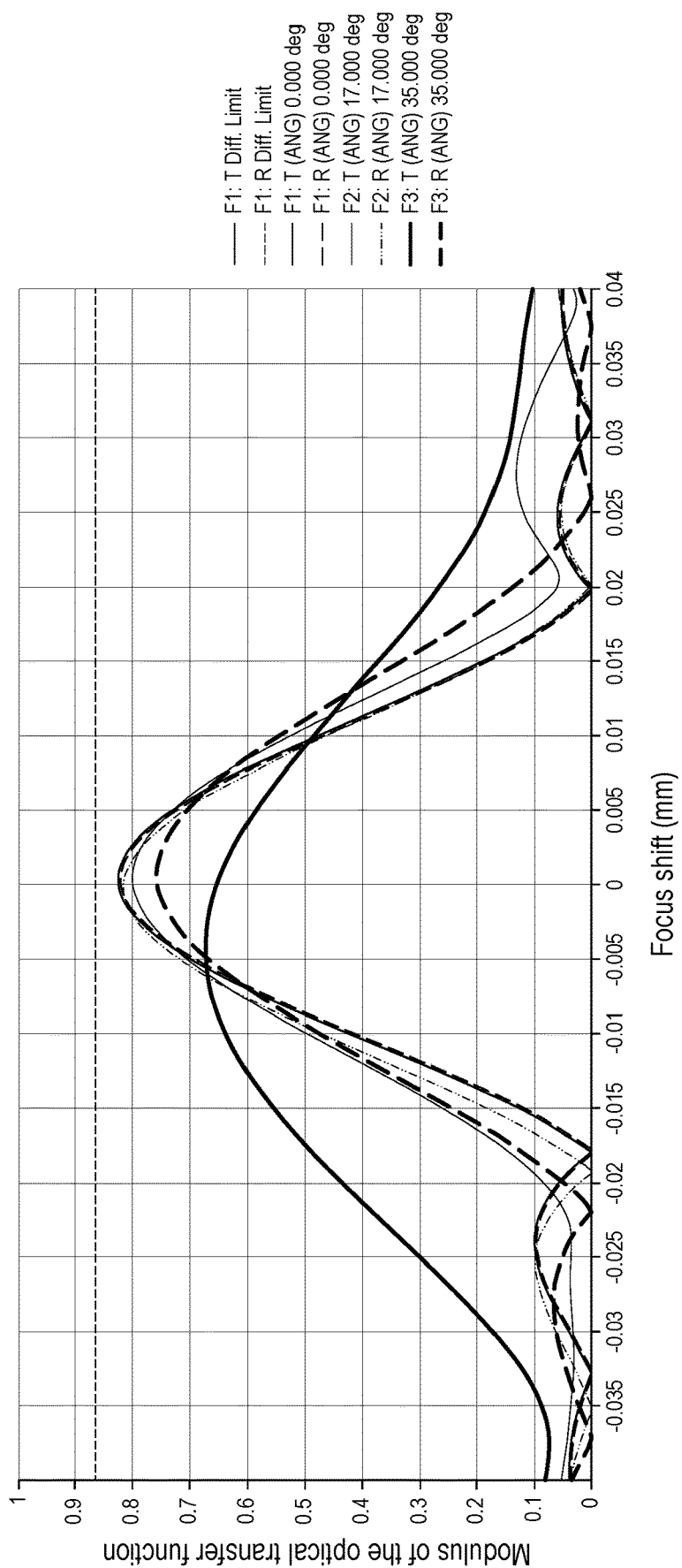
Figure 5:
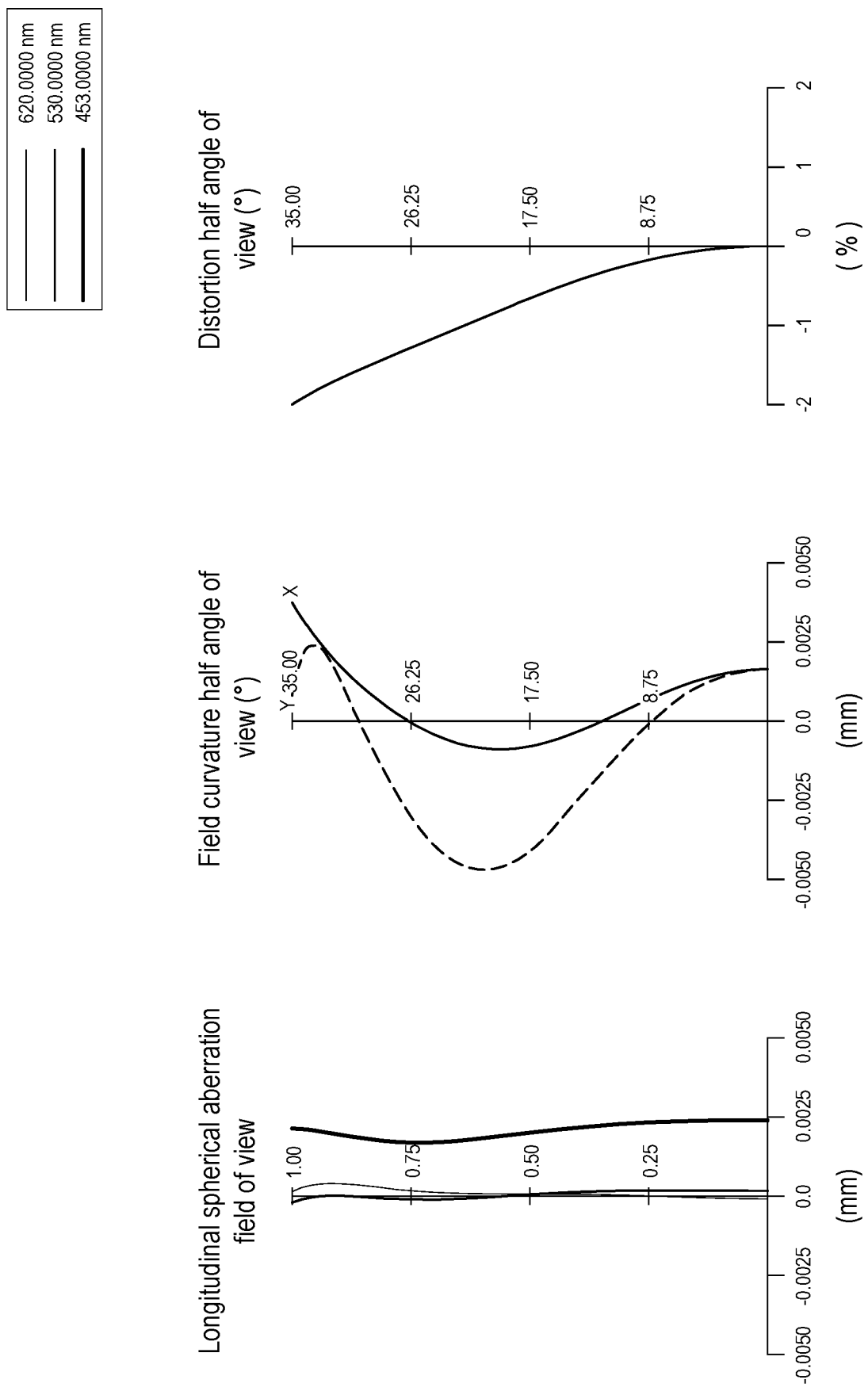
FIG. 5 is a diagram of longitudinal spherical aberration and various aberrations of the optical lens module in FIG. 2.
Figure 6:
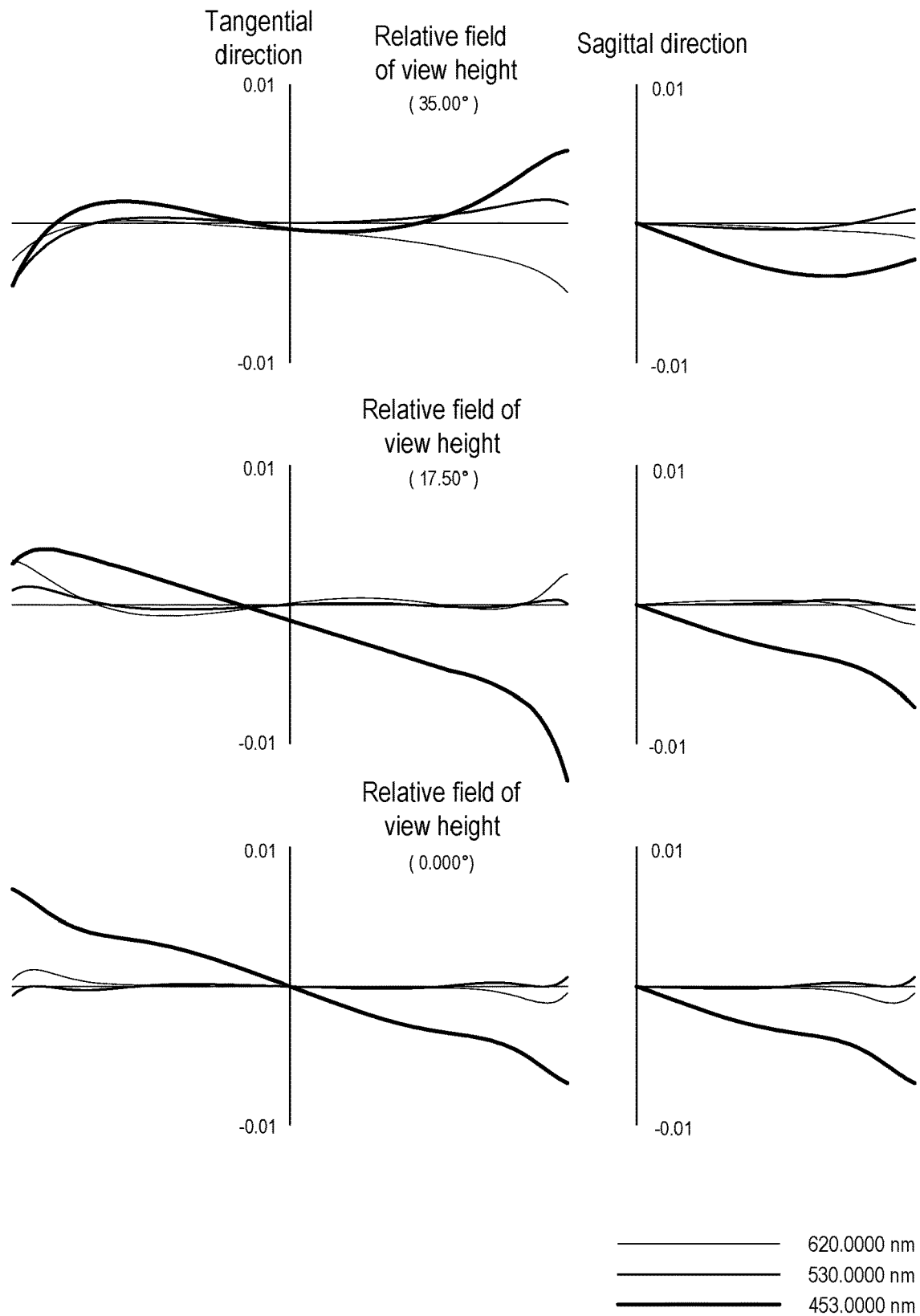
FIG. 6 is a ray fan plot of the optical lens module in FIG. 2.

Referring to FIG. 3 to FIG. 6, FIG. 3 and FIG. 4 respectively are modulation transfer function charts of different representations of the optical lens module in FIG. 2 on the imaging plane of the display element. FIG. 5 is a diagram of longitudinal spherical aberration and various aberrations of the optical lens module in FIG. 2. FIG. 6 is a ray fan plot of the optical lens module in FIG. 2. The horizontal axis of FIG. 3 is the spatial frequency (cycles/mm), and the vertical axis is the modulus of the optical transfer function. In FIG. 4, the spatial frequency is 120.0 cycles/mm, the horizontal axis of FIG. 4 is focus shift, and the vertical axis is the modulus of the optical transfer function. "T" in FIG. 3 and FIG. 4 represents the curve in the tangential direction, "R" represents the curve in the sagittal direction, the value marked next to "TR" represents the angle, and "Diff. Limit"

represents the diffraction limit. FIG. 3 and FIG. 4 illustrate that the optical lens module 10 of this embodiment has a good optical effect. FIG. 5 illustrates the longitudinal spherical aberration diagram, the astigmatic field curvature diagram, and the distortion diagram of the optical lens module 10 of this embodiment. It may be seen from the figure that the error degree is small, therefore, the optical lens module 10 has good optical effect. FIG. 6 illustrates the ray fan plot of the optical lens module 10 of the present embodiment, and the plot shown are all within the standard range, thus it may be verified that the optical lens module 10 of this embodiment may achieve good optical imaging quality.

To sum up, in the optical lens module, the optical engine module, and the head-mounted display of the present invention, the multiple lens elements include a first lens element, a second lens element, a third lens element, a fourth lens element, and a fifth lens element arranged in sequence along an optical axis from an object side to the image source side, and the optical lens module have a semi-reflective layer, a phase retardation layer and a polarization reflection layer respectively formed on surfaces of a part of the lens elements. Therefore, the image light beam provided by the display element may achieve the effect of folding the light path by transmitting through the semi-reflective layer, the phase retardation layer, and the polarization reflection layer. In this way, the volume of the optical lens module may be reduced, and at the same time, the optical lens module has a large field of view angle and a large aperture.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical lens module, configured to receive at least one image light beam from an image source side, the optical lens module comprising:
    a plurality of lens elements, comprising a first lens element, a second lens element, a third lens element, a fourth lens element, and a fifth lens element arranged in sequence along an optical axis from an object side to the image source side, and the optical lens module having a semi-reflective layer, a phase retardation layer, and a polarization reflection layer respectively formed on different surfaces of a part of the plurality of lens elements, the optical lens module having an aperture on the object side;
    wherein the optical lens module is a secondary imaging optical system, and the at least one image light beam is transmitted by the optical lens module and forms an intermediate image between the aperture and the image source side.

2. The optical lens module according to claim 1, wherein a field of view angle of the optical lens module is greater than 65 degrees.

3. The optical lens module according to claim 1, wherein the first lens element to the fifth lens element respectively include an object side surface facing the object side and an image side surface facing the image source side, wherein the polarization reflection layer is disposed on the image side surface of the first lens element, the semi-reflective layer is disposed on the image side surface of the second lens element, and the phase retardation layer is disposed on the object side surface of the second lens element.

4. The optical lens module according to claim 1, wherein refractive powers of the first lens element to the fifth lens element are respectively negative, negative, positive, negative, and positive.

5. The optical lens module according to claim 1, wherein the at least one image light beam transmitted to the plurality of lens elements is a circularly polarized light.

6. The optical lens module according to claim 1, wherein the phase retardation layer is a quarter-wavelength phase retarder.

7. The optical lens module according to claim 1, wherein at least one of the plurality of lens elements is an aspheric lens element.

8. The optical lens module according to claim 1, wherein the equivalent focal length of the optical lens module is a negative value.

9. The optical lens module according to claim 1, wherein an aperture value of the optical lens module is a negative value.

10. The optical lens module according to claim 1, wherein the at least one image light beam from the image source side is transmitted to the semi-reflective layer, the phase retardation layer, the polarization reflection layer, the phase retardation layer, the semi-reflective layer, the phase retardation layer, and the polarization reflection layer in sequence.

11. The optical lens module according to claim 1, wherein an imaging position of the intermediate image is located in the range of the first lens element and the second lens element.

12. An optical engine module, comprising:
    at least one display element, configured to provide at least one image light beam; and
    an optical lens module, disposed on a transmission path of the at least one image light beam, the optical lens module comprising a plurality of lens elements, the plurality of lens elements comprising a first lens element, a second lens element, a third lens element, a fourth lens element, and a fifth lens element arranged in sequence along an optical axis from an object side to the at least one display element, and the optical lens module having a semi-reflective layer, a phase retardation layer, and a polarization reflection layer respectively formed on different surfaces of a part of the plurality of lens elements, the optical lens module having an aperture on the object side;

wherein the optical lens module is a secondary imaging optical system, and the at least one image light beam is transmitted by the optical lens module to and forms an intermediate image between the aperture and the at least one display element.

13. The optical engine module according to claim 12, further comprising:
a light combining element, disposed between the optical lens module and the at least one display element, a number of the at least one display element is a plurality.

14. The optical engine module according to claim 12, further comprising:
a light transmissive prism, disposed between the optical lens module and the at least one display element, a number of the at least one display element is one.

15. A head-mounted display, comprising:
a waveguide, having a first side and a second side opposite to each other;
a coupling-in element, disposed on the first side or the second side;
a coupling-out element, disposed on the first side; and
an optical engine module, disposed on the first side and corresponding to the coupling-in element, the optical engine module comprising:
at least one display element, configured to provide at least one image light beam; and
an optical lens module, disposed on a transmission path of the at least one image light beam, the optical lens module comprising a plurality of lens elements, the optical lens module having an aperture on the object side, the optical lens module having a semi-reflective layer, a phase retardation layer, and a polarization reflection layer respectively formed on different surfaces of a part of the plurality of lens elements,
wherein the at least one image light beam is transmitted to the coupling-in element and the coupling-out element in sequence by the optical engine module,
the optical engine module is a secondary imaging optical system, and the at least one image light beam is transmitted by the optical lens module and forms an intermediate image between the aperture and the at least one display element.

16. The head-mounted display according to claim 15, wherein a field of view angle of the optical lens module is greater than 65 degrees.

17. The head-mounted display according to claim 15, wherein the plurality of lens elements comprises a first lens element, a second lens element, a third lens element, a fourth lens element, and a fifth lens element arranged in sequence along an optical axis from an object side to the image source side, and the first lens element to the fifth lens element respectively include an object side surface facing the object side and an image side surface facing the image source side, wherein the polarization reflection layer is disposed on the image side surface of the first lens element, the semi-reflective layer is disposed on the image side surface of the second lens element, and the phase retardation layer is disposed on the object side surface of the second lens element.

18. The head-mounted display according to claim 15, wherein the plurality of lens elements comprises a first lens element, a second lens element, a third lens element, a fourth lens element, and a fifth lens element arranged in sequence along an optical axis from an object side to the image source side, and refractive powers of the first lens element to the fifth lens element are respectively negative, negative, positive, negative, and positive.

19. The head-mounted display according to claim 18, wherein the aperture is located on the coupling-in element.

20. The head-mounted display according to claim 15, wherein the at least one image light beam transmitted to the plurality of lens elements is a circularly polarized light.

21. The head-mounted display according to claim 15, wherein the phase retardation layer is a quarter-wavelength phase retarder.

22. The head-mounted display according to claim 15, wherein at least one of the plurality of lens elements is an aspheric lens element.

23. The head-mounted display according to claim 15, wherein the equivalent focal length of the optical lens module is a negative value.

24. The head-mounted display according to claim 15, wherein an aperture value of the optical lens module is a negative value.

25. The head-mounted display according to claim 15, wherein the at least one image light beam from the at least one display element is transmitted to the semi-reflective layer, the phase retardation layer, the polarization reflection layer, the phase retardation layer, the semi-reflective layer, the phase retardation layer, and the polarization reflection layer in sequence.

* * * * *